(12) United States Patent
Talarico et al.

(10) Patent No.: US 12,048,005 B2
(45) Date of Patent: Jul. 23, 2024

(54) INDICATION OF TRANSMISSION BANDWIDTH BASED ON WIDEBAND IN NEW RADIO (NR)

(71) Applicant: Apple Inc., Cupertino, CA (US)

(72) Inventors: Salvatore Talarico, Sunnyvale, CA (US); Lopamudra Kundu, Santa Clara, CA (US); Jeongho Jeon, San Jose, CA (US); Dae Won Lee, Portland, OR (US)

(73) Assignee: Apple Inc., Cupertino, CA (US)

(*) Notice: Subject to any disclaimer, the term of this patent is extended or adjusted under 35 U.S.C. 154(b) by 553 days.

(21) Appl. No.: 17/268,212

(22) PCT Filed: Aug. 21, 2019

(86) PCT No.: PCT/US2019/047456
§ 371 (c)(1),
(2) Date: Feb. 12, 2021

(87) PCT Pub. No.: WO2020/041439
PCT Pub. Date: Feb. 27, 2020

(65) Prior Publication Data
US 2021/0321457 A1    Oct. 14, 2021

Related U.S. Application Data

(60) Provisional application No. 62/720,481, filed on Aug. 21, 2018.

(51) Int. Cl.
*H04W 74/0816* (2024.01)
*H04B 1/525* (2015.01)
(Continued)

(52) U.S. Cl.
CPC ........ *H04W 74/0816* (2013.01); *H04B 1/525* (2013.01); *H04J 13/0062* (2013.01);
(Continued)

(58) Field of Classification Search
CPC ......... H04W 74/0816; H04W 72/0453; H04W 74/004; H04J 13/0062; H04B 1/525; H04L 5/001; H04L 5/0098
See application file for complete search history.

(56) References Cited

U.S. PATENT DOCUMENTS 7,403,575 B2 * 7/2008 Gehring ................. H04B 1/719
375/308
10,149,209 B2 * 12/2018 Lepp ................... H04W 52/367
(Continued)

FOREIGN PATENT DOCUMENTS

CN    104901775 A    9/2015
CN    104917597 A    9/2015
(Continued)

OTHER PUBLICATIONS

International Preliminary Report on Patentability dated Feb. 23, 2021 for International Application No. PCT/US2019/047456.
(Continued)

*Primary Examiner* — Omar J Ghowrwal
(74) *Attorney, Agent, or Firm* — Eschweiler & Potashnik, LLC

(57) ABSTRACT

A network device (e.g., a user equipment (UE), a new radio NB (gNB), or other network component) can process or generate a dynamic indication that indicates a transmission bandwidth based on a wideband bandwidth. One or more downlink (DL) signals can be provided with the indication of the transmission bandwidth that enables a tuning of communications within the wideband bandwidth based on the indication for new radio (NR) communications in heterogeneous network domains ranging from Enhanced Mobile Broadband (eMBB) to massive Machine-Type Communications (mMTC) and Ultra-Reliable Low-Latency Communications (URLLC) or the like.

17 Claims, 6 Drawing Sheets

(51) Int. Cl.
*H04J 13/00* (2011.01)
*H04L 5/00* (2006.01)
*H04W 72/0453* (2023.01)
*H04W 74/00* (2009.01)

(52) U.S. Cl.
CPC ............ *H04L 5/001* (2013.01); *H04L 5/0098* (2013.01); *H04W 72/0453* (2013.01); *H04W 74/004* (2013.01)

(56) References Cited

U.S. PATENT DOCUMENTS

| | | |
|---|---|---|
| 10,313,995 B2 * | 6/2019 | Yun .................. H04L 5/1438 |
| 2004/0163129 A1 * | 8/2004 | Chapman ............ H04N 21/437 725/111 |
| 2011/0053627 A1 | 3/2011 | Ramakrishna |
| 2013/0064119 A1 | 3/2013 | Montojo et al. |
| 2015/0054523 A1 | 2/2015 | Perkinson |
| 2016/0374084 A1 | 12/2016 | Zhang |
| 2017/0006426 A1 | 1/2017 | Fu et al. |
| 2017/0134960 A1 | 5/2017 | Zhang |
| 2017/0149593 A1 | 5/2017 | Ko et al. |
| 2018/0176942 A1 | 6/2018 | Kim et al. |
| 2019/0273578 A1 * | 9/2019 | Jeon .................. H04L 1/0071 |

FOREIGN PATENT DOCUMENTS

| | | |
|---|---|---|
| CN | 105556889 A | 5/2016 |
| CN | 107113861 A | 8/2017 |
| CN | 107745682 A | 3/2018 |
| CN | 107872847 A | 4/2018 |
| EP | 3500011 A1 | 6/2019 |
| EP | 3547587 A1 | 10/2019 |
| WO | 2011/025277 A2 | 3/2011 |
| WO | 2015023604 A1 | 2/2015 |
| WO | 2015135496 A1 | 9/2015 |
| WO | 2016071763 A1 | 5/2016 |
| WO | 2018/085154 A1 | 5/2018 |

OTHER PUBLICATIONS

3GPP TS 38.201 V15.0.0; 3rd Generation Partnership Project; Technical Specification Group Radio Access Network; NR; Physical layer; General description; (Release 15); Dec. 2017; pp. 2-12.
International Search Report dated Jan. 2, 2020 for International Application No. PCT/US2019/047456.
3GPP TSG RAN WG1 Meeting #93 "BWP operation in NR unlicensed band" Published on May 21, 2018.

* cited by examiner

INDICATION OF TRANSMISSION BANDWIDTH BASED ON WIDEBAND IN NEW RADIO (NR)

REFERENCE TO RELATED APPLICATIONS

This application is a National Phase entry application of International Patent Application No. PCT/US2019/047456 filed Aug. 21, 2019, which claims priority to U.S. Provisional Application No. 62/720,481 filed Aug. 21, 2018, entitled "TRANSMISSION BANDWIDTH INDICATION FOR WIDEBAND TRANSMISSION IN NEW RADIO (NR) SYSTEMS OPERATING ON UNLICENSED SPECTRUM" and is hereby incorporated by reference in its entirety.

FIELD

The present disclosure relates to wireless technology and more specifically to wideband transmission for new radio (NR) systems communication on unlicensed spectrum.

BACKGROUND

Mobile communication has advanced remarkably in the past two decades: emerging from early voice systems and transforming into today's highly sophisticated integrated communication platforms. The next generation wireless communication system, 5G, or new radio (NR) is going to provide ubiquitous connectivity and access to information, as well as ability to share data, around the globe. NR is expected to be a unified framework that will target to meet versatile and sometimes, conflicting performance criteria and provide services to vastly heterogeneous application domains ranging from Enhanced Mobile Broadband (eMBB) to massive Machine-Type Communications (mMTC) and Ultra-Reliable Low-Latency Communications (URLLC), to name a few. In general, NR will evolve based on third generation partnership project (3GPP) long term evolution (LTE)-Advanced technology with additional enhanced radio access technologies (RATs) to enable seamless and faster wireless connectivity solutions.

One major enhancement for LTE in Rel-13 had been to enable the operation of cellular networks in the unlicensed spectrum, via Licensed-Assisted-Access (LAA). Ever since, exploiting the access of unlicensed spectrum has been considered by 3GPP as one of the promising solutions to cope with the ever increasing growth of wireless data traffic. One of the important considerations for LTE to operate in unlicensed spectrum is to ensure fair co-existence with incumbent systems like wireless local area networks (WLANs), which has been the primary focus of LAA standardization effort since Rel. 13.

Following the trend of LTE enhancements, study on NR based access to unlicensed spectrum (NR-unlicensed) is ongoing starting with 3GPP Release (Rel)-15. The channel access mechanism aspect is one of the fundamental building blocks for NR-unlicensed for deployment options. The adoption of Listen-Before-Talk (LBT) in LTE based LAA system was crucial in achieving fair coexistence with the neighboring systems sharing the unlicensed spectrum in addition to fulfilling the regulatory requirements. In order to provide a global solution of unified framework, NR-based unlicensed access will also use LBT based channel access mechanisms. Because wideband operation is one of the key building blocks for enabling NR-unlicensed operation, it is essential to support mechanisms that would facilitate wideband operation by utilizing dynamic bandwidth adaptation in an efficient manner.

DETAILED DESCRIPTION

Figure 1:
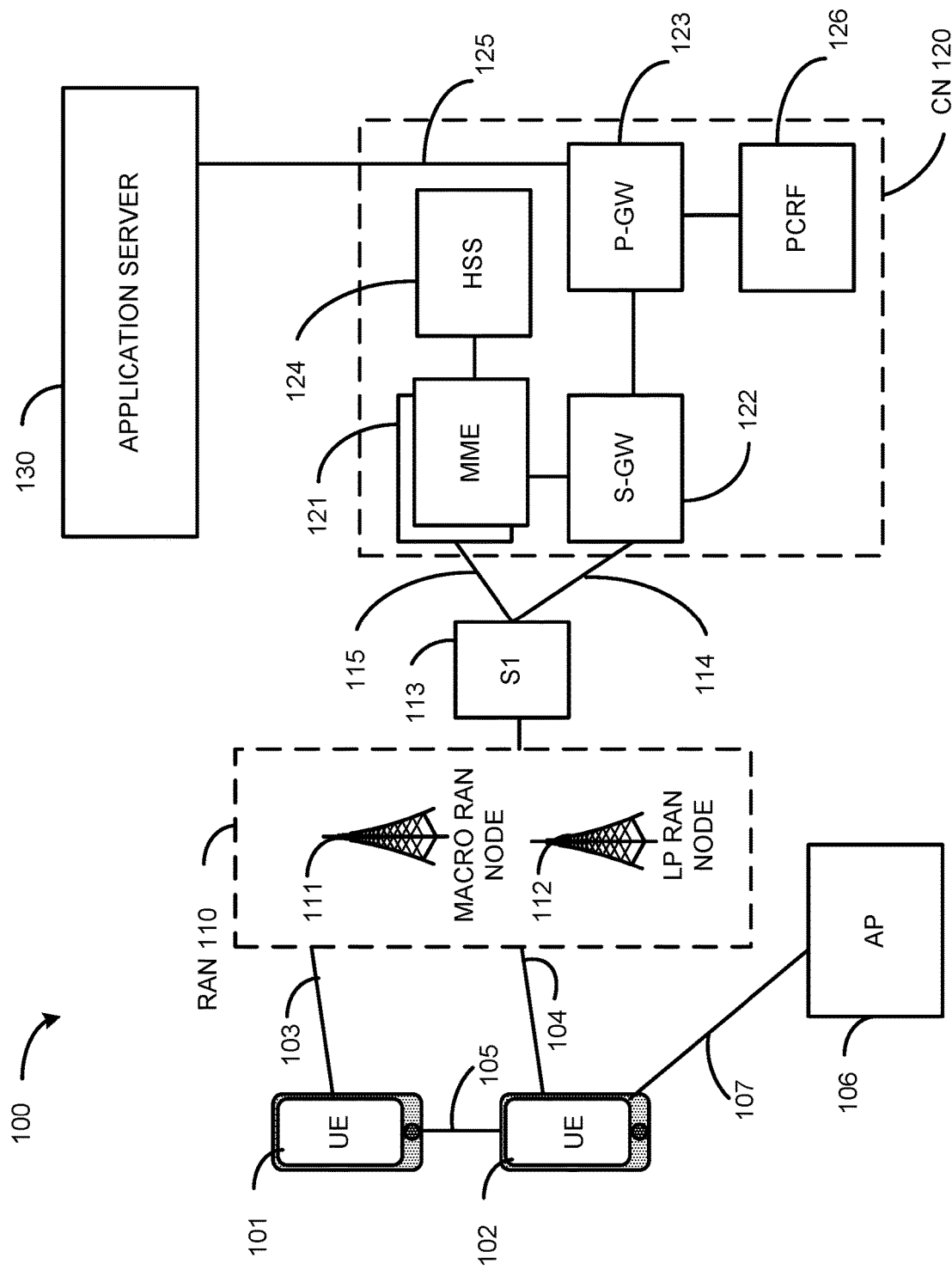
FIG. 1 is a block diagram illustrating an example of user equipment(s) (UEs) and gNBs or access nodes in a network with network components useable in connection with various aspects described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include an Application Specific Integrated Circuit (ASIC), an electronic circuit, a processor (shared, dedicated, or group), or associated memory (shared, dedicated, or group) operably coupled to the circuitry that execute one or more software or firmware programs, a combinational logic circuit, or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein can be implemented into a system or network device using any suitably configured hardware and/or software. FIG. 1 illustrates an architecture of a system 100 of a network in accordance with some embodiments. The system 100 is illustrated to include a UE 101 and a UE 102, which can further represent new radio (NR) devices (e.g., a UE or gNB) or the like as discussed herein.

FIG. 1 illustrates an architecture of a system 100 of a network in accordance with some embodiments. The system 100 is shown to include a user equipment (UE) 101 and a UE 102. As used herein, the term "user equipment" or "UE" may refer to a device with radio communication capabilities and may describe a remote user of network resources in a communications network. The term "user equipment" or "UE" may be considered synonymous to, and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. In this example, UEs 101 and 102 are illustrated as smartphones (e.g., handheld touch-screen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or the like In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections (or channels) 103 and 104, respectively, each of which comprises a physical communications interface or layer (discussed in further detail infra). As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information. In this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH). In various implementations, the SL interface 105 may be used in vehicular applications and communications technologies, which are often referred to as V2X systems. V2X is a mode of communication where UEs (for example, UEs 101, 102) communicate with each other directly over the PC5/SL interface 105 and can take place when the UEs 101, 102 are served by RAN nodes 111, 112 or when one or more UEs are outside a coverage area of the RAN 110. V2X may be classified into four different types: vehicle-to-vehicle (V2V), vehicle-to-infrastructure (V2I), vehicle-to-network (V2N), and vehicle-to-pedestrian (V2P). These V2X applications can use "co-operative awareness" to provide more intelligent services for end-users. For example, vehicle UEs (vUEs) 101, 102, RAN nodes 111, 112, application servers 130, and pedestrian UEs 101, 102 may collect knowledge of their local environment (for example, information received from other vehicles or sensor equipment in proximity) to process and share that knowledge in order to provide more intelligent services, such as cooperative collision warning, autonomous driving, and the like. In these implementations, the UEs 101, 102 may be implemented/employed as Vehicle Embedded Communications Systems (VECS) or vUEs.

The UE 102 is shown to be configured to access an access point (AP) 106 (also referred to as "WLAN node 106", "WLAN 106", "WLAN Termination 106" or "WT 106" or the like) via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below). In various embodiments, the UE 102, RAN 110, and AP 106 may be configured to utilize LTE-WLAN aggregation (LWA) operation and/or WLAN LTE/WLAN Radio Level Integration with IPsec Tunnel (LWIP) operation. The LWA operation may involve the UE 102 in RRC_CONNECTED being configured by a RAN node 111, 112 to utilize radio resources of LTE and WLAN. LWIP operation may involve the UE 102 using WLAN radio resources (e.g., connection 107) via Internet Protocol Security (IPsec) protocol tunneling to authenticate and encrypt packets (e.g., internet protocol (IP) packets) sent over the connection 107. IPsec tunneling may include encapsulating entirety of original IP packets and adding a new packet header, thereby protecting the original header of the IP packets.

The RAN 110 can include one or more access nodes that enable the connections 103 and 104. As used herein, the terms "access node," "access point," or the like may describe equipment that provides the radio baseband functions for data and/or voice connectivity between a network and one or more users. These access nodes can be referred to as base stations (BS), NodeBs, evolved NodeBs (eNBs), next Generation NodeBs (gNB), RAN nodes, Road Side Units (RSUs), and so forth, and can comprise ground stations (e.g., terrestrial access points) or satellite stations providing coverage within a geographic area (e.g., a cell). The term "Road Side Unit" or "RSU" may refer to any transportation infrastructure entity implemented in or by a gNB/eNB/RAN node or a stationary (or relatively stationary) UE, where an RSU implemented in or by a UE may be referred to as a "UE-type RSU", an RSU implemented in or by an eNB may be referred to as an "eNB-type RSU." The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance with various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, 8, etc.).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120 via an S1 interface 113. In embodiments, the CN 120 may be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network 120 and external networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

Figure 2:
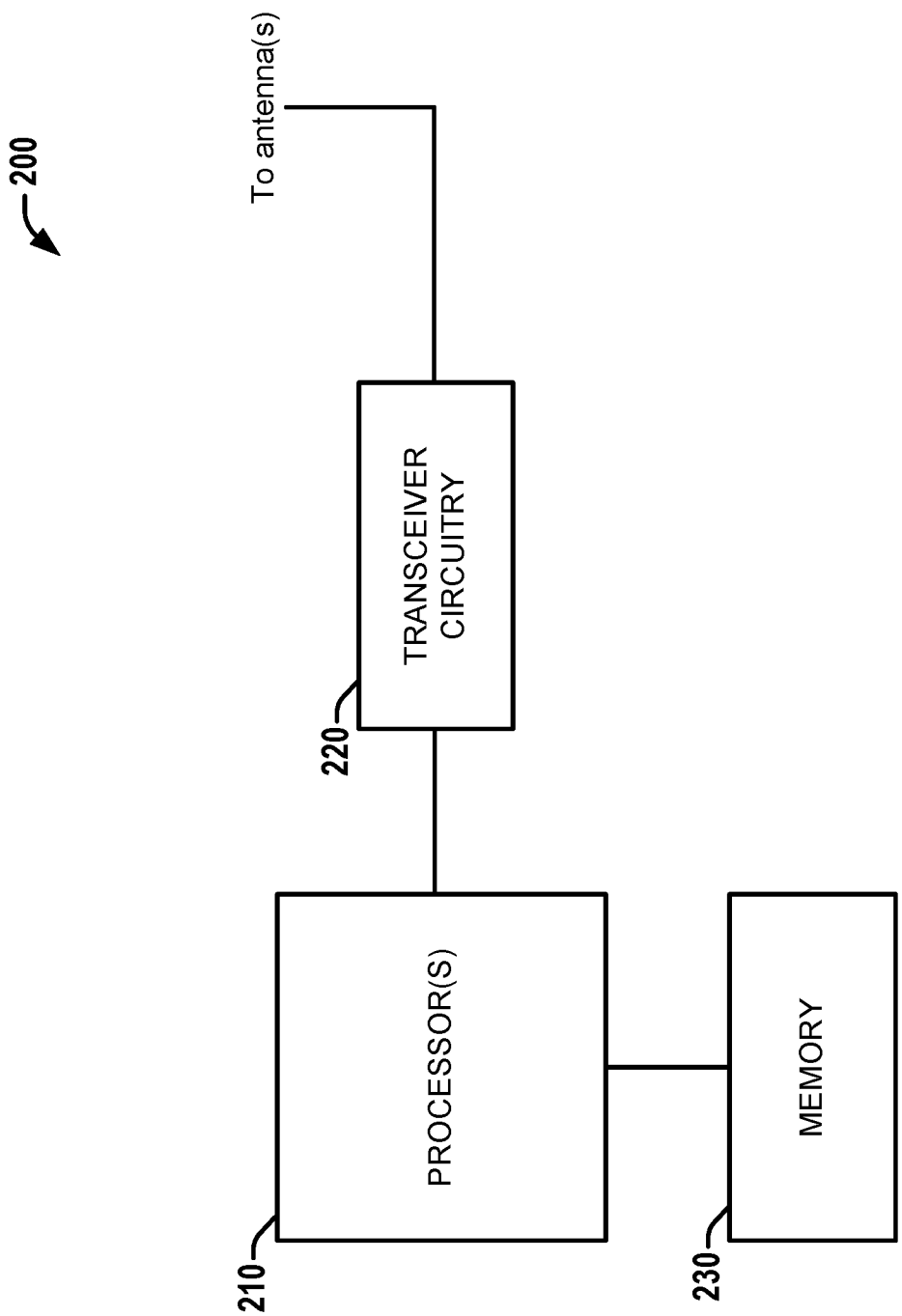
FIG. 2 is a block diagram illustrating a system employable at a UE or gNB, according to various aspects described herein.

Referring to FIG. 2, illustrated is a block diagram of a system/device 200 employable at a UE (e.g., URLLC UEs, or non-URLLC UEs) or other network device (e.g., gNB/eNB) that facilitates one or more aspects/embodiments herein. System 200 can include one or more processors 210 (e.g., one or more baseband processors such as one or more of the baseband processors discussed in connection with the other FIGs.) comprising processing circuitry and associated interface(s), transceiver circuitry 220 (e.g., comprising part or all of RF circuitry, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 230 (which can comprise any of a variety of storage mediums and can store instructions and/or data associated with one or more of processor(s) 210 or transceiver circuitry 220).

In various embodiments/aspects described herein an enhanced PUSCH transmission can be configured, generated, processed, communicated, transmitted or received for example depending on the network device or component. In particular, various embodiment are directed to UE behavior and signaling of dynamic PUSCH repetition factor in Downlink Control Information (DCI) (e.g., as in Release 16), which can be in contrast to semi-static operation of repetition in NR communication (in a previous Release of related 3GPP standards); inter-bandwidth part (BWP) frequency hopping; transport block size (TBS) scaling; and enhanced configured grant (CG) UL transmission. Enhanced CG UL can be renamed from Semi-Persistent Scheduling (SPS) in previous LTE scheduling, but now in NR considered CG for UL while in DL as SPS, for example.

The adoption of Listen-Before-Talk (LBT) in LTE based LAA system has been used in achieving fair coexistence with the neighboring systems sharing the unlicensed spectrum, in addition to fulfilling the regulatory requirements. In order to provide a global solution of unified framework, NR-based unlicensed access can also use LBT based channel access mechanisms. In particular, NR-unlicensed operation can operate according to the following aspects: 1) if absence of Wi-Fi cannot be guaranteed (e.g., by regulation) in the band (sub-7 GHz), where NR-U is operating, the NR-U operating bandwidth is an integer multiple of 20 MHz; 2) at least for band where absence of Wi-Fi cannot be guaranteed, LBT can be performed in units of 20 MHz.

Because wideband operation is one of the key building blocks for enabling NR-unlicensed operation, mechanisms can be configured that would facilitate wideband operation by utilizing dynamic bandwidth adaptation depending on which 20 MHz chunk(s) of bandwidth the gNB 111, 112, or 200, or UE 101, 102, or 200 can access the medium on. Since both gNB 111, 112, or 200, or UE 101, 102, or 200 are to perform LBT before initiating downlink (DL)/uplink (UL) transmission in unlicensed spectrum, sub-band LBT with 20 MHz resolution can be exploited opportunistically to aid channel access instead of using single LBT over an entire wideband.

At the same time, developing detailed signaling aspects related to conveying the necessary information pertaining to dynamic bandwidth adaptation as an outcome of sub-band specific LBT to the other end of the radio link (i.e. to UE 101, 102, or 200 in case of UL, and to gNB 111, 112, or 200 in case of DL) is useful in incorporating the advantages on sub-band LBT in restricted unlicensed spectrum access.

In various aspects, or embodiments herein, configurations/methods of signaling transmission bandwidth indication related to LBT-dependent dynamically adapted bandwidth configuration both from gNB (e.g., 111, 112, or 200), or UE (e.g., 101, 102, or 200) points of view are disclosed.

When NR operates on an unlicensed band, LBT can be performed. In absence of Wi-Fi or other incumbent technologies, new radio NR operation in unlicensed spectrum (NR-U) can be configured to operate on a bandwidth that is an integer multiple of 20 MHz, and in an embodiment, LBT can be performed in one or more units of 20 MHz across a band or a wideband of more than one unit of 20 MHz. In this case, the gNB 111, 112, or 200 might observe that the LBT has succeeded only on few sub bands, for example, and before it can transmit on those, potentially it would adjust its RF settings (e.g., center frequency, analog filters, or digital filters, etc.). However, the receiving node (e.g., UE 101), or other receiving network device) is unaware of the exact transmission bandwidth applied after LBT by the gNB 111. Without this information, the UE 101 would not be able to change, and tune opportunistically its RF settings, i.e. baseband retuning, analog/digital (A/D) conversion, automatic gain AGC component, filters, etc. As a result, the UE 101 could potentially be vulnerable to in-band interference that it might receive within those sub-bands on which the gNB 111 was not able to succeed in the LBT. Thus, this could be a problem, based on the severity of the in-band interference.

When operating an NR system on a sub-7 GHz unlicensed band (NR-U) (e.g., a band at 7 GHz or below), both the gNB 111 and the UE 101 must perform LBT before they can start transmitting a DL or an UL TX burst. When NR-U operates in wideband, the NR-U operating bandwidth is an integer multiple of 20 MHz, and in order to meet the regulatory requirements and to ensure fair coexistence with the other incumbent technologies, NR-U should support sub-band LBT at least with 20 MHz resolution. This implies that the transmitter should be able to adapt dynamically the transmission bandwidth, depending on which 20 MHz sub-bands the gNB or the UE are able to successfully perform LBT in the attempt to contend the channel with other devices Referring to FIG. 3, illustrated is an example of a dynamic bandwidth adjustment 300 based on one or more LBT successes for different sub-bands within a wideband bandwidth in accordance with various aspects.

In Rel-15 NR, the gNB 111, 112, or 200 could maintain constant bandwidth, while UE 101, 102, 200 operates on specific bandwidth part of the gNB bandwidth. However, as mentioned above, in NR-U the gNB 111, 112, or 200 according to various aspects can perform NR communication over a wideband transmission 302, on a band (as a sub-band of a wideband) which is an integer multiple of 20 MHz, and before accessing the channel it performs an LBT for each 20 MHz sub-band. In the present illustrated example 300, the wideband 302 can comprise about 100 MHz and five sub-bands 304. However, a different number of sub-bands can also be utilized within a same or other wideband for sub unlicensed sub-7 GHz band wireless communications with or without licensed assisted access.

As such, the gNB 111, 112, or 200 may succeed LBT on only few of the 20 MHz bands (e.g., the top two sub-bands 304, or another number/other sub-bands 304) that constitute the transmission bandwidth over which the transmission is intended to be performed (as the wideband bandwidth). In this case, in order to initiate a transmission (TX) burst in a transmission bandwidth (e.g., first and second (checked) sub-bands 304), the gNB 111, 112, or 200 can adjust its RF settings (center frequency, analog/digital filters, gain, other related RF communication settings, etc.) to satisfy the standards/regulatory rules for the unlicensed sub-7 GHz band wireless communications. However, the receiver may not know the exact transmission bandwidth of the gNB TX burst, for example, (or otherwise as applicable also in UL, the UE 101 TX bandwidth burst) since this is conditional to the success of the LBT. In fact, while the gNB 111, 112, or 200 transmits over a narrower bandwidth (e.g., two of the sub-bands with successful LBTs and not the other unsuccessful ones within the wideband 302), the UE 101, 102, 200, (gNB in UL) without any explicit or implicit information, may not otherwise adjust its RF settings to match the TX bandwidth (e.g., by the gNB for the downlink (DL) reception, or vice versa by UE in UL). Without a proper RF retuning, a receiving node (e.g. a UE 101, 102, 200 or gNB) can be particularly vulnerable to the in-band interference that it receives potentially from other network devices (e.g., UEs or otherwise) transmitting within the sub-bands in which has not succeeded its LBT(s).

Figure 3:
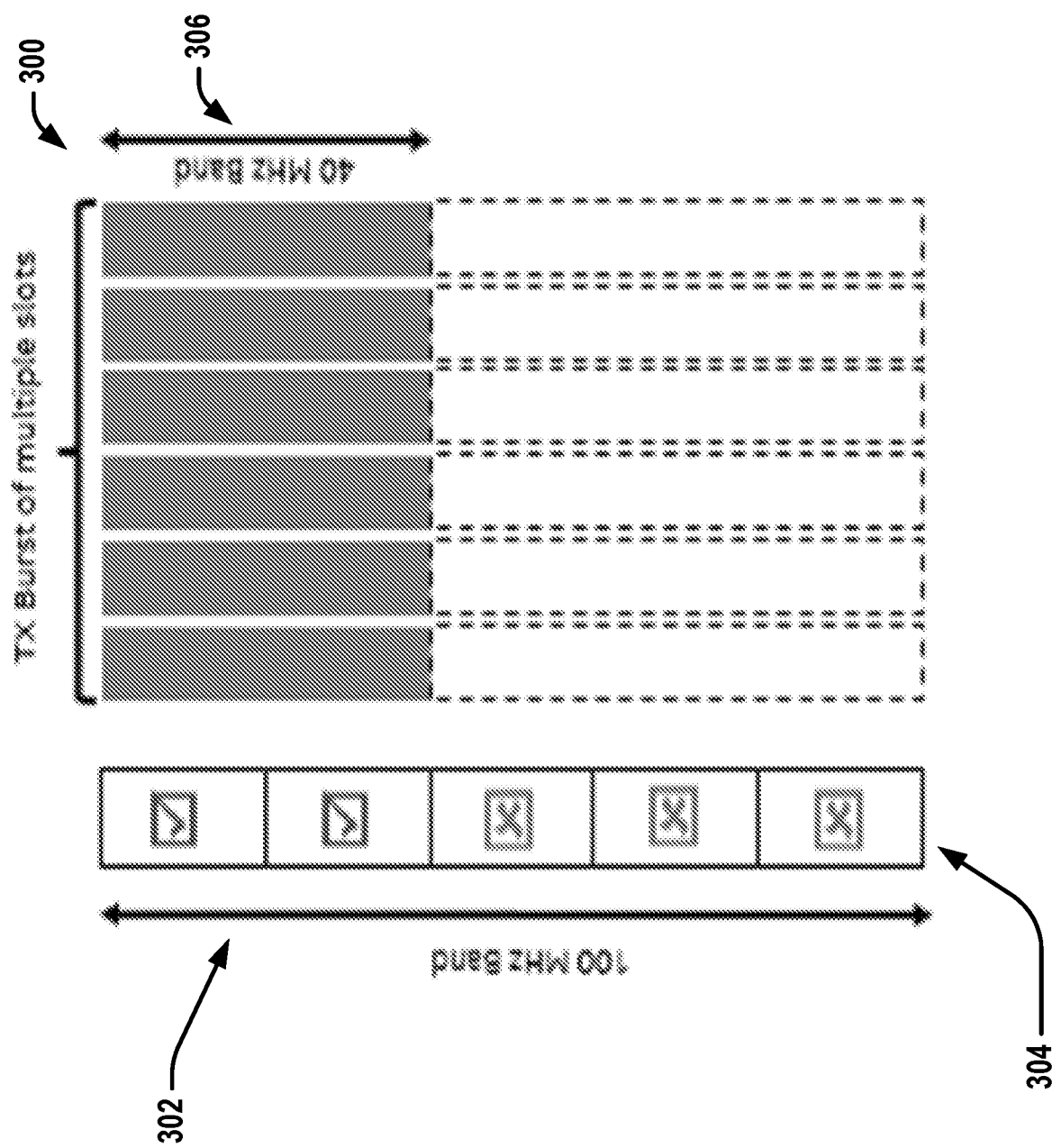
FIG. 3 is another block diagram illustrating a dynamic bandwidth adjustment based on LBT success over 20 MHz sub-bands in accordance with various aspects described herein.

An illustration of these embodiments is detailed in FIG. 3, where as an example the gNB 111, 112, or 200 can perform a wideband 302 transmission (e.g., over 100 MHz), and performs LBT over each of the 20 MHz sub-bands 304 that composes the wideband 302, and only succeeds LBT for the two upper 20 MHz sub-bands (checked bands) of all the sub-bands 304 otherwise making up the wideband 302. In this case, while the UE 101, 102, 200 might be configured to receive transmission over the whole 100 MHz, the Tx burst from the gNB 111, 112, or 200 is transmitted only over 40 MHz. Although the top two-sub-bands are illustrated there can be a different number or order/sequence of the sub-bands where LBT is successful and used for the transmission bandwidth to transmit on. although five sub-bands are envisioned here, another number may also be partitioned and performed with separate LBTs for NR communication on a different wideband or the same in length/duration/frequency band.

Various embodiments can include dynamic indications of the Tx bandwidth. As mentioned above, unless the UE 101, 102, 200 is informed of the changed gNB's TX bandwidth, for example, it will potentially receive a significant amount of in-band interference on the sub-bands that the gNB 111, 112, or 200 is not using. In order to mitigate the issue, a dynamic indication of the TX bandwidth can be performed, in order to allow the UE 101, 102, 200 to timely adjust its RF settings, and prevent from being subject from the in-band interference within the sub-bands over which the gNB 111, 112, or 200 has not succeeded, and is not performing any DL transmission, for example. Unless subdued, these interfering signals (essentially noise, generated, for example, due to transmissions from other UEs within the same cell or other gNBs within the network) can overpower the genuine signal transmitted from the UE 101, 102, 200 over narrower bandwidth than originally intended transmission bandwidth and in the worst case, the receiver at the UE 101, 102, 200 side could completely fail to decode the received signal.

In this section, multiple embodiments are disclosed regarding methods to alleviate the issues related to in-band interference, as mentioned above. Note that, while this invention disclosure primarily focuses on the DL burst transmission, and indication of the gNB's TX bandwidth to its serving UE 101, 102, 200, similar embodiments can be straightforwardly extended to the case of UL burst transmission.

When configuring a dynamic indication of a TX bandwidth 306, particular consideration can be made for processing time of the UE 101, 102, 200 to decode additional information related to the TX bandwidth (e.g., first two sub-bands of sub-bands 304 each with successful LBTs) associated that is adjusted by the gNB 111, 112, or 200 based on its LBT procedure, which can be done with a resolution of 20 MHz, and transmitted or communicated along with the DL data transmission.

In one embodiment, the indication related to the length of the TX bandwidth and the specific sub-bands used can be configured dynamically and dynamically indicated through the DCI for DL transmission (or UCI for UL transmission). The sub-bands (in units of 20 MHz, for example) constituting the total TX bandwidth can be contiguous or non-contiguous or a combination thereof. Alternatively, or additionally, in another embodiment, these two information/parameters (e.g., length/duration and the sub-bands constituting the length) can be dis-jointly, or separately, indicated by introducing/configuring two or more independent fields within the NR communication or a physical channel, for example.

In an aspect, a number of X bits (e.g. 2~3 bits, wherein X is any positive integer) can be used or configured to indicate the bandwidth (i.e., 20 MHz, 40 MHz, 60 MHz, 80 MHz, 100 MHz) used for the TX burst. Alternatively, or additionally, a bitmap can be introduced to indicate the specific sub-bands that are used by the transmitter, where the most significant bit (MSB) can indicate the highest sub-band, and the least significant bit (LSB) of the bitmap can indicate the lowest sub-band or vice versa, where the sub-bands can be numbered/indexed in a hierarchical order (i.e. sequentially starting from the upper band edge or the lower band edge) while indicating via bitmap.

In a further aspect, the sub-bands that can be used by the transmitter can only be contiguous. In this case, to indicate the sub-bands used, UE 101, 102, 200 could be provided with the number of sub-bands and an indication of the first sub-band used either from the upper band edge or from the lower band edge by the gNB 111, 112, or 200, where the band is the total TX bandwidth that the gNB 111, 112, or 200 intended to use for transmission prior to performing LBT.

Alternatively, or additionally, in another option, if the LBT succeeds over a number of non-contiguous sub-bands, the transmitter (UE 101, gNB 111, or other network component) can only use the consecutive sub-band(s) closest to the upper edge or the lower edge of the band, in order to avoid any complex decoder implementations at the receiver side and limit memory utilization, and leave the other bands (not contiguous with the chosen band) unused, even if LBT succeeded over them.

Alternatively, or additionally, in another option, only the sub-bands, which are used by the transmitter (contiguous or non-contiguous), are dynamically indicated to the receiver (UE 101, gNB 111, or other network component), without any explicit indication of the total TX bandwidth and the transmission bandwidth is implicitly derived at the receiver side based on the information of sub-bands used for transmission post LBT.

Figure 4:
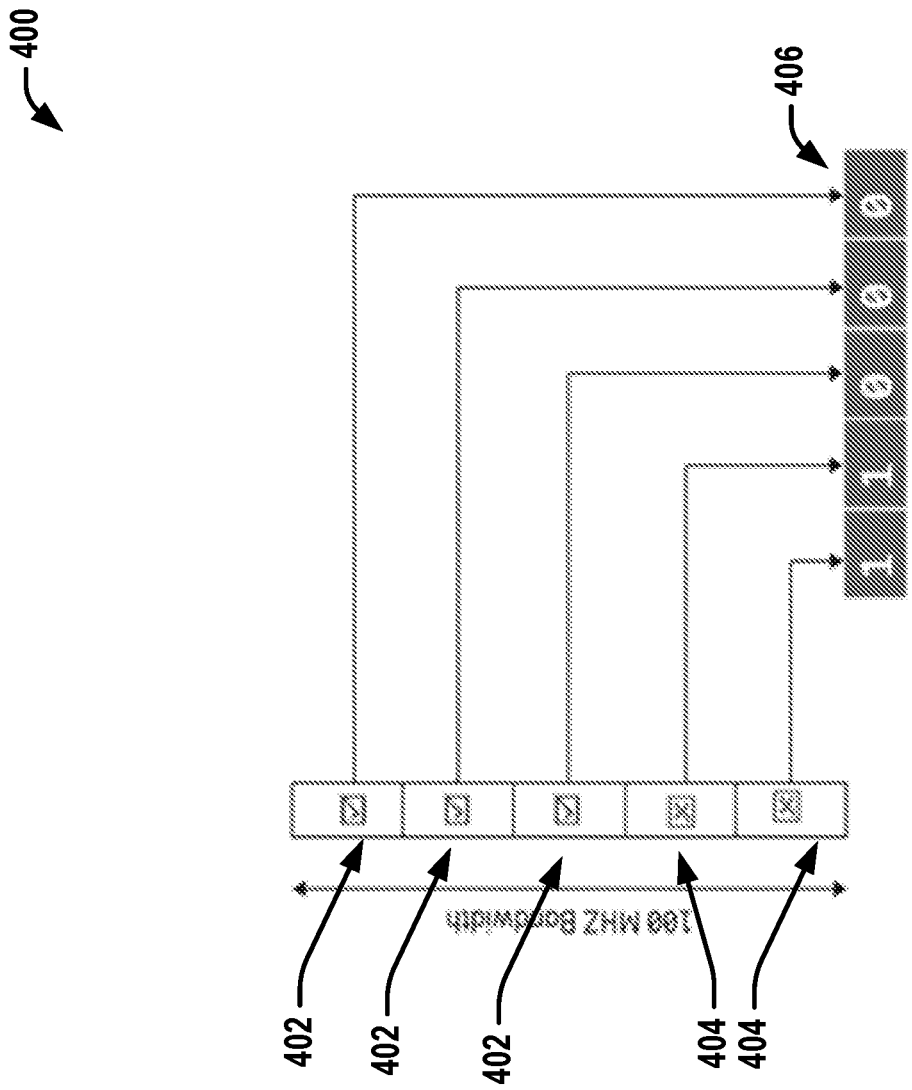
FIG. 4 is a diagram illustrating bitmap indication of a transmission bandwidth of a wideband in accordance with various aspects/embodiments described herein.

Referring now to FIG. 4, illustrated is an example bitmap 400 indication of a transmission bandwidth in accordance with one or more embodiments/aspects herein. The dynamic indication of the length of the TX bandwidth and the specific sub-bands could be provided in a joint manner.

For example, a total of X bits 406 could be configured/used, each bit indicating whether a specific sub-band 402 thru 404 is used or not, and the total number of non-zero bits 406, say "n" (for example, n=3, or otherwise) would indicate the TX bandwidth as n*M MHz, where M is the bandwidth of each sub-band (as one example, M=20 MHz). As another example, a total of X bits 406 can be used/configured, each bit indicating whether a specific sub-band is used or not, and the total number of zero bits, say "n" (for example, n=3, or otherwise) would indicate the TX bandwidth as n*M MHz, where M is the bandwidth of each sub-band (as one example, M=20 MHz, or other frequency).

In one embodiment, the MSB can indicate the sub-band closest to the lower edge of the band and LSB that of the sub-band closest to the upper edge of the band, as illustrated or vice versa, for example.

In another embodiment, the dynamic indication of the length of the TX bandwidth and the specific sub-bands can be provided in a joint manner through X bits, with a specific coding according to the permutations of the valid sub-bands which can be used. For example, if the total bandwidth or wideband BW is 100 MHz, and if the sub-bands are configured to be or pre-defined as contiguous, a total of 4 bits can be used with the following coding: 0000 ($1^{st}$ 20 MHz sub-band)/0001 ($2^{nd}$ 20 MHz sub-band)/0010 ($3^{rd}$ 20 MHz sub-band)/0011 ($4^{th}$ 20 MHz sub-band)/0100 ($5^{th}$ 20 MHz sub-band) for 20 MHz indication; 0101 ($1^{st}$ consecutive 40 MHz band)/0110 ($2^{nd}$ consecutive 40 MHz band)/0111 ($3^{rd}$ consecutive 40 MHz band)/1000 ($4^{th}$ consecutive 40 MHz band) for 40 MHz band; 1001 ($1^{st}$ consecutive 60 MHz band)/1010 ($2^{nd}$ consecutive 60 MHz band)/1011 ($3^{rd}$ consecutive 60 MHz band) for 60 MHz band; 1100 ($1^{st}$ consecutive 80 MHz band)/1101 ($2^{nd}$ consecutive 80 MHz band) for 80 MHz band; 1110 for 100 MHz band; while the value 1111 can be left as reserved for future use.

Figure 5:
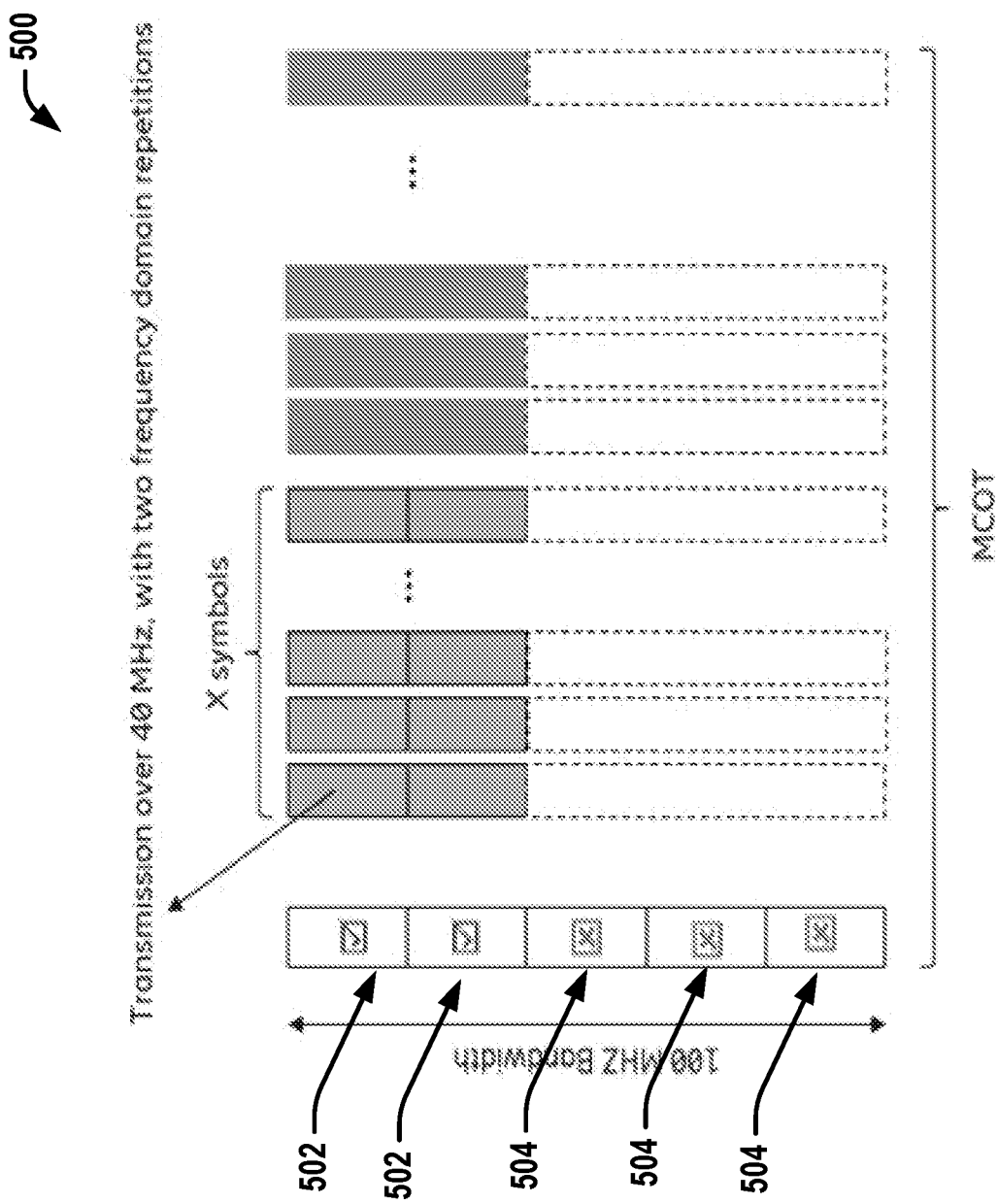
FIG. 5 is a block diagram illustrating a transmission of an indication of a transmission bandwidth of a wideband according to various aspects/embodiments described herein.

Referring to FIG. 5, illustrated is an example transmission of an indication of a transmission bandwidth in accordance with various aspects/embodiments herein. A transmitter device (e.g., UE, gNB or other network device or component) can transmit indication of its TX bandwidth in each of the sub-bands (e.g., 502) that it uses.

In an aspect, control information with indication of its TX bandwidth can be transmitted over a 20 MHz band, and repeated over the sub-bands over which the transmitter succeeded its LBT within a wideband (e.g., 100 MHz) for unlicensed NR communications.

Additionally, or alternatively, in another aspect, the receiver (e.g., UE, gNB or other network device or component) can perform initial reception within a 20 MHz band, before it performs RF retuning to the TX bandwidth indicated in the DCI.

Additionally, or alternatively, in another aspect, the transmitter can continuously transmit control information with indication of its TX bandwidth 502 using a Y MHz band (for example, Y=20 MHz, or other positive integer bandwidth within a wideband) repeated in frequency domain over all available sub-bands (e.g., as a repetition of X symbols, wherein X is a positive integer or greater than zero). The transmission of the control information is performed over X symbols, before the gNB 111, 112, or 200 starts transmitting over the whole bandwidth available without any frequency domain repetitions in units of sub-bands. In this case, the UE 101, 102, 200, for example, is set to perform reception over Y MHz band, until it is able to perform RF retuning and be able to receive over the whole TX bandwidth. Further, a plurality or set of X symbols is repeated at least twice.

Additionally, or alternatively, in another aspect, the UE 101, 102, 200 expects the transmission of the control information which contains indication of its TX bandwidth on a specific sub-band, or group of sub-bands.

Additionally, or alternatively, in another aspect, a gap can be configured or introduced between the transmission of the control information with indication of the TX bandwidth, which is performed in units of sub-bands, and the rest of the transmission, which is performed over the whole available bandwidth.

In an embodiment, the transmitter can always transmit indication of its TX bandwidth in a specific sub-band or set of sub-bands. If the LBT fails over that sub-band or set of sub-bands, even if LBT succeeds over other sub-bands, the gNB 111, 112, or 200 does not perform any transmissions, since the UE 101, 102, 200 will not be able to receive any information related to the TX bandwidth and perform RF retuning accordingly.

In another embodiment, the indication of the length of the TX bandwidth can be provided through a dedicated signal. In an example aspect, this signal can span over Y={1, 2, 3, 4, . . . N} symbols. The signal can consist of a Zadoff-Chu sequence with a specific root q or a specific cyclic shift, which is used to indicate the TX bandwidth. Alternatively, or additionally, in another option, the sequence can be repeated in a time domain over the multiple symbols over which this signal extends. Alternatively, or additionally, in another option, the cyclic shift of the Demodulation Reference Signal (DMRS) can carry information related to the TX bandwidth and the sequence used for DMRS can be a ZC sequence.

Figure 6:
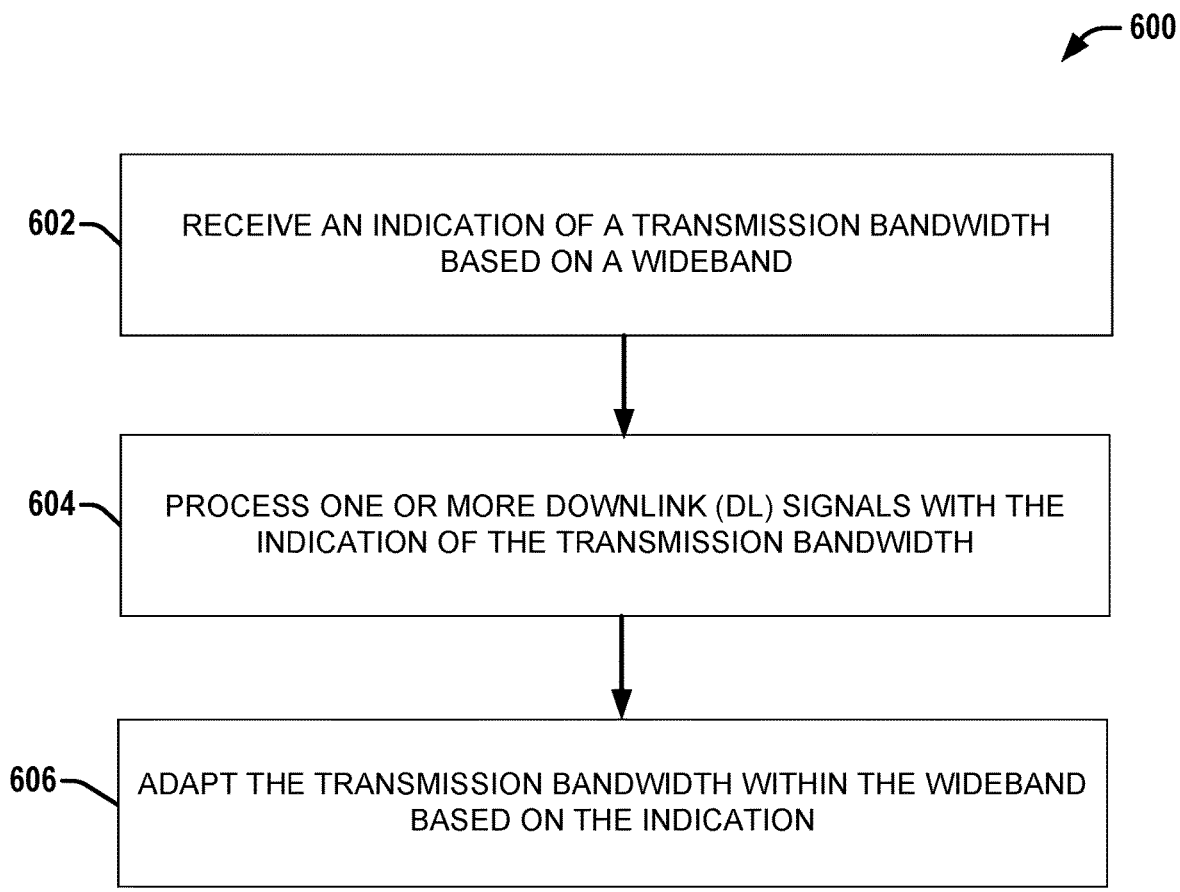
FIG. 6 is a block diagram illustrating an example process flow according to various aspects/embodiments described herein.

Referring to FIG. 6, illustrated an example process flow 600 for a network device (e.g., a user equipment (UE), a new radio NB (gNB), 5GC component/network device or the like) can process, generate, or monitor new radio (NR) communication via a 5G network system (5GS) to perform operations for unlicensed NR communications.

The process flow 600 initiates at 602 with receiving an indication of a transmission bandwidth based on a wideband.

At 604, the process flow 600 continues with processing one or more downlink (DL) signals with the indication of the transmission bandwidth.

At 606, the process flow comprises adapting the transmission bandwidth within the wideband based on the indication.

Other aspects of the process flow 600 can include providing dynamically a length of the transmission bandwidth and indicating specific sub-bands in a joint manner through X bits, with a specific coding according to one or more permutations of sub-bands configured for use.

The indication can be processed or generated by UE or a gNB for UL or DL by processing the indication of the transmission bandwidth as a dedicated signal that spans over Y={1,2,3,4, . . . N} symbols based on a Zadoff-Chu sequence with a specific root q or a cyclic shift that indicates the transmission bandwidth. As such, the process flow 600 can also include receiving one or more repetitions of a sequence in time domain over the symbols over which this signal extends, wherein the cyclic shift is based on a reference signal comprising a Demodulation Reference Signal (DMRS) to carry information related to the transmission bandwidth and the sequence comprises a Zadoff-Chu sequence.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

Examples can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described herein.

Examples can include one or more non-transitory computer-readable media comprising instructions to cause an electronic device, upon execution of the instructions by one or more processors of the electronic device, to perform one or more elements of a method described in or related to any of examples above, or any other method or process described herein.

A first example is an apparatus configured to be employed in a User Equipment (UE) for a new radio (NR) communication comprising: one or more processors configured to: receive an indication of a transmission bandwidth based on a wideband; process one or more downlink (DL) signals with the indication of the transmission bandwidth; and adapt the transmission bandwidth within the wideband based on the indication; a radio frequency (RF) interface, configured to provide, to RF circuitry, data for transmitting the NR communication based on the DL signals with the transmission bandwidth.

A second example can include the first example, wherein the transmission bandwidth comprises one or more sub-bands within the wideband, wherein each of the one or more sub-bands comprises about 20 MHz.

A third example can include the first or second example, wherein the indication of the transmission bandwidth comprises one or more sub-bands within the wideband that are less than a total number of sub-bands of the wideband transmission, and wherein the one or more sub-band are associated with a successful listen before talk (LBT) operation thereat.

A fourth example can include any one of the first through third examples, wherein the wideband comprises up to about 100 MHz and sub-bands of a total number of sub-bands of the wideband forming the transmission bandwidth.

A fifth example can include any one of the first through fourth examples, wherein the indication of the transmission bandwidth indicates a change of the transmission bandwidth comprising a same number or a different number of sub-bands within the wideband that enables the UE to eliminate interference by adjusting one or more settings based on the change.

A sixth example can include any one of the first through fifth examples, wherein the transmission bandwidth varies over different NR communications from among one or more sub-bands in the wideband that are less or a same in number than a total number of sub-bands of the wideband.

A seventh example can include any one of the first through sixth examples, wherein the one or more sub-bands comprise about 20 MHz, respectively, and the wideband comprises up to about 100 MHz.

An eighth example is an apparatus configured to be employed in a next generation NodeB (gNB) for a new radio (NR) communication comprising: one or more processors configured to: generate an indication of a transmission bandwidth based on a wideband bandwidth; and provide one or more downlink (DL) signals with the indication of the transmission bandwidth to enable a tuning of communication within the wideband bandwidth based on the indication of the transmission bandwidth; a radio frequency (RF) interface, configured to provide, to RF circuitry, data for transmitting the NR communication comprising the DL signals with the transmission bandwidth.

A ninth example can include the eighth example, wherein the one or more processors are further configured to: transmit the indication of the transmission bandwidth on a physical channel for a DL transmission or processed on an uplink (UL) control information (UCI) for a UL transmission; wherein the indication of the transmission bandwidth indicates which sub-bands of the wideband bandwidth are associated with a successful LBT operation.

A tenth example can include the eighth example or the ninth example, wherein the sub-bands of the transmission bandwidth are at least one of: contiguous sub-bands or non-contiguous sub-bands or a combination thereof within the wideband bandwidth.

An eleventh example can include any one of the eighth through tenth examples, wherein the indication comprises two or more independent fields, a number of bits, or a bitmap, to indicate the transmission bandwidth within the wideband bandwidth based on a number of sub-bands.

A twelfth example can include any one of the eighth through eleventh examples, wherein the number of bits indicate a length of the transmission bandwidth, and the bitmap indicates particular sub-bands that are used for transmission bandwidth, where a most significant bit (MSB) indicates a highest sub-band or a lowest sub-band, and a least significant bit (LSB) indicates a lowest sub-band or a highest sub-band, respectively.

A thirteenth example can include any one of the eighth through twelfth examples, wherein the transmission bandwidth comprises a sub-set of contiguous sub-bands of the wideband bandwidth for transmission in DL or UL, and the indication indicates a first sub-band used either from an upper band edge or from a lower band edge, wherein the wideband bandwidth comprises a total transmit (TX) bandwidth intended for transmission prior to performing LBT operations on the sub-set of contiguous sub-bands.

A fourteenth example can include any one of the eighth through thirteenth examples, wherein the one or more processors are further configured to: in response to LBT operations succeeding over a number of non-contiguous sub-bands of the wideband bandwidth, using only consecutive sub-band(s) closest to an upper edge or a lower edge of the wideband bandwidth.

A fifteenth example can include any one of the eighth through fourteenth examples, wherein the one or more processors are further configured to dynamically indicate only sub-bands (contiguous or non-contiguous) used, without an explicit indication of a total TX bandwidth.

A sixteenth example can include any one of the eighth through fifteenth examples, wherein the one or more processors are further configured to dynamically indicate a length of the transmission bandwidth and one or more specific sub-bands in a joint manner, wherein the indication comprises a total of X bits where each bit of the total of X bits indicates whether a specific sub-band is being used for transmission, and a total number of non-zero bits indicates the transmission bandwidth as n*M MHz, where M is a bandwidth of each sub-band of the wideband bandwidth.

A seventeenth example is a computer readable storage device storing executable instructions that, in response to execution, cause one or more processors of User Equipment (UE) for a new radio (NR) communication to perform operations, the operations comprising: receiving an indication of a transmission bandwidth based on a wideband; processing one or more downlink (DL) signals with the indication of the transmission bandwidth; and adapting the transmission bandwidth within the wideband based on the indication.

An eighteenth example can include the seventeenth example, wherein the operations further comprise: providing dynamically a length of the transmission bandwidth and indicating specific sub-bands in a joint manner through X bits, with a specific coding according to one or more permutations of sub-bands configured for use.

A nineteenth example can include the eighteenth or seventeenth example, wherein the operations further comprise: processing the indication of the transmission bandwidth as a dedicated signal that spans over Y={1, 2, 3, 4, . . . N} symbols based on a Zadoff-Chu sequence with a specific root q or a cyclic shift that indicates the transmission bandwidth.

A twentieth example includes any one of the eighteenth through nineteenth examples, wherein the operations further comprise: receiving one or more repetitions of a sequence in time domain over the symbols over which this signal extends, wherein the cyclic shift is based on a reference signal comprising a Demodulation Reference Signal (DMRS) to carry information related to the transmission bandwidth and the sequence comprises a Zadoff-Chu sequence.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the processes and/or actions of a method or algorithm can reside as one or any combination or set of codes and/or instructions on a machine-readable medium and/or computer readable medium, which can be incorporated into a computer program product.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. A User Equipment (UE) for a new radio (NR) communication comprising:
   one or more processors configured to:
      receive an indication of a transmission bandwidth based on a wideband;
      process one or more downlink (DL) signals with the indication of the transmission bandwidth; and
      adapt the transmission bandwidth within the wideband based on the indication, wherein the transmission bandwidth varies over different NR communications from among one or more sub-bands in the wideband that are less or a same in number than a total number of sub-bands of the wideband;
   a radio frequency (RF) interface, configured to provide, to RF circuitry, data for transmitting the NR communication based on the DL signals with the transmission bandwidth.

2. The UE of claim 1, wherein the transmission bandwidth comprises one or more sub-bands within the wideband, wherein each of the one or more sub-bands comprises 20 MHz.

3. The UE of claim 1, wherein the indication of the transmission bandwidth comprises one or more sub-bands within the wideband that are less than a total number of sub-bands of the wideband, and wherein the one or more sub-band are associated with a successful listen before talk (LBT) operation thereat.

4. The UE of claim 1, wherein the wideband comprises up to 100 MHz and sub-bands of a total number of sub-bands of the wideband forming the transmission bandwidth.

5. The UE of claim 1, wherein the indication of the transmission bandwidth indicates a change of the transmission bandwidth comprising a same number or a different number of sub-bands within the wideband that enables the UE to eliminate interference by adjusting one or more settings based on the change.

6. The UE of claim 1, wherein the transmission bandwidth comprises one or more sub-bands within the wideband, wherein the one or more sub-bands comprise 20 MHz, respectively, and the wideband comprises up to 100 MHz.

7. A base station for a new radio (NR) communication comprising:
   one or more processors configured to:
      generate an indication of a transmission bandwidth based on a wideband bandwidth;
      provide one or more downlink (DL) signals with the indication of the transmission bandwidth to enable a tuning of communication within the wideband bandwidth based on the indication of the transmission bandwidth; and
      in response to listen before talk (LBT) operations succeeding over a number of non-contiguous sub-bands of the wideband bandwidth, using only consecutive sub-band(s) closest to an upper edge or a lower edge of the wideband bandwidth for transmitting the NR communication;

a radio frequency (RF) interface, configured to provide, to RF circuitry, data for transmitting the NR communication comprising the DL signals with the transmission bandwidth.

8. The base station of claim 7, wherein the one or more processors are further configured to:
transmit the indication of the transmission bandwidth on a physical channel for a DL transmission or processed on an uplink (UL) control information (UCI) for a UL transmission;
wherein the indication of the transmission bandwidth indicates which sub-bands of the wideband bandwidth are associated with a successful LBT operation.

9. The base station of claim 7, wherein the transmission bandwidth comprises one or more sub-bands within the wideband bandwidth, wherein the sub-bands of the transmission bandwidth are at least one of: contiguous sub-bands or the non-contiguous sub-bands or a combination thereof within the wideband bandwidth.

10. The base station of claim 7, wherein the indication comprises two or more independent fields, a number of bits, or a bitmap, to indicate the transmission bandwidth within the wideband bandwidth based on a number of sub-bands.

11. The base station of claim 10, wherein the number of bits indicate a length of the transmission bandwidth, and the bitmap indicates particular sub-bands that are used for transmission bandwidth, where a most significant bit (MSB) indicates a highest sub-band or a lowest sub-band, and a least significant bit (LSB) indicates a lowest sub-band or a highest sub-band, respectively.

12. The base station of claim 7, wherein the transmission bandwidth comprises a sub-set of contiguous sub-bands of the wideband bandwidth for transmission in DL or uplink (UL), and the indication indicates a first sub-band used either from the upper edge or from the lower edge, wherein the wideband bandwidth comprises a total transmit (TX) bandwidth for transmission prior to performing the LBT operations on the sub-set of contiguous sub-bands.

13. The base station of claim 7, wherein the one or more processors are further configured to dynamically indicate only sub-bands (contiguous or non-contiguous) used, without an explicit indication of a total transmit (TX) bandwidth.

14. The base station of claim 7, wherein the one or more processors are further configured to dynamically indicate a length of the transmission bandwidth and one or more specific sub-bands in a joint manner, wherein the indication comprises a total of X bits where each bit of the total of X bits indicates whether a specific sub-band is being used for transmission, and a total number of non-zero bits indicates the transmission bandwidth as n*M MHz, where M is a bandwidth of each sub-band of the wideband bandwidth.

15. A computer readable storage device storing executable instructions that, in response to execution, cause one or more processors of User Equipment (UE) for a new radio (NR) communication to perform operations, the operations comprising:
receiving an indication of a transmission bandwidth based on a wideband;
processing one or more downlink (DL) signals with the indication of the transmission bandwidth;
adapting the transmission bandwidth within the wideband based on the indication; and
providing dynamically a length of the transmission bandwidth and indicating specific sub-bands in a joint manner through X bits, with a specific coding according to one or more permutations of sub-bands configured for use.

16. The computer readable storage device of claim 15, wherein the operations further comprise:
processing the indication of the transmission bandwidth as a dedicated signal that spans over Y={1,2,3,4, . . . N} symbols based on a Zadoff-Chu sequence with a specific root q or a cyclic shift that indicates the transmission bandwidth.

17. The computer readable storage device of claim 15, wherein the operations further comprise:
receiving one or more repetitions of a sequence in time domain over symbols over which this signal extends, wherein a cyclic shift is based on a reference signal comprising a Demodulation Reference Signal (DMRS) to carry information related to the transmission bandwidth and the sequence comprises a Zadoff-Chu sequence.

* * * * *